United States Patent
Peev et al.

(10) Patent No.: US 8,086,772 B2
(45) Date of Patent: Dec. 27, 2011

(54) TRANSFERABLE COMPONENT THAT EFFECTUATES PLUG-AND-PLAY

(75) Inventors: Igor B. Peev, Seattle, WA (US); Zeke Koch, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 12/245,985

(22) Filed: Oct. 6, 2008

(65) Prior Publication Data

US 2009/0037612 A1     Feb. 5, 2009

Related U.S. Application Data

(63) Continuation of application No. 11/256,255, filed on Oct. 21, 2005, now Pat. No. 7,433,982.

(51) Int. Cl.
*G06F 13/12* (2006.01)
*G06F 15/16* (2006.01)

(52) U.S. Cl. ............... 710/72; 710/8; 710/62; 709/227; 709/230; 709/217

(58) Field of Classification Search .......... 709/227–230, 709/237, 217–219; 710/8–14, 60–64, 72–74; 719/321
See application file for complete search history.

(56) References Cited

U.S. PATENT DOCUMENTS

| | | | |
|---|---|---|---|
| 6,857,437 B2 | 2/2005 | Fury et al. | |
| 6,957,437 B1 * | 10/2005 | Bogia et al. | 719/327 |
| 7,010,624 B1 * | 3/2006 | Zhou et al. | 710/8 |
| 2001/0029526 A1 * | 10/2001 | Yokoyama et al. | 709/218 |
| 2006/0037029 A1 | 2/2006 | Yamada | |
| 2006/0047029 A1 * | 3/2006 | Poloso et al. | 524/86 |
| 2006/0248398 A1 * | 11/2006 | Neel et al. | 714/33 |

FOREIGN PATENT DOCUMENTS

| | | |
|---|---|---|
| KR | 10-2001-0035354 A | 5/2001 |
| KR | 10-2003-0025435 A | 3/2003 |
| KR | 10-2005-0091927 A | 9/2005 |
| WO | 03065682 A1 | 8/2003 |
| WO | 2005069541 A1 | 7/2005 |

OTHER PUBLICATIONS

International Search Report dated Feb. 23, 2007 for PCT Application Serial No. PCT/US2006/039534, 3 pages.
Wikipedia, Mobile device (definition), pp. 1-3.

* cited by examiner

*Primary Examiner* — Christopher B Shin
(74) *Attorney, Agent, or Firm* — Woodcock Washburn LLP

(57) ABSTRACT

A plug-and-play system comprises an agent component that includes instructions for enabling a first device and a mobile device to be compatible upon detecting a connection between the first device and the mobile device. A transfer component pushes the agent component from the mobile device to the first device, and the agent component executes upon reaching the first device. For example, the mobile device can be a mobile phone, a PDA, a personal organizer, and the like, and the first device can be a personal computer, a laptop computer, or a mobile device.

20 Claims, 9 Drawing Sheets

TRANSFERABLE COMPONENT THAT EFFECTUATES PLUG-AND-PLAY

CROSS REFERENCE TO RELATED APPLICATIONS

This application is a continuation of U.S. patent application Ser. No. 11/256,255, filed on Oct. 21, 2005, entitled "TRANSFERABLE COMPONENT THAT EFFECTUATES PLUG-AND-PLAY", the entirety of which is incorporated herein by reference.

BACKGROUND

Conventional plug and play technology can be a contradiction in terms. In more detail, plug and play technology can enable creation of interfaces and establishment of communications between multiple devices. Ideally, the creation of the interfaces and subsequent communications occur with a minimal amount of user activity. However, for conventional plug and play technology, this may not always be the case.

For example, devices can include or be associated with different components, operating systems, protocols, etc. Thus, a user attempting to interface a personal organizer with a personal computer, for example, may not be able to initiate user interface creation and enable communications between the devices by physically connecting the devices. When interfacing the personal organizer with the personal computer for the first time, the communications protocols and associated software considerations must first be analyzed and configured on both machines before any useful communication between the devices can occur.

One drawback of conventional plug and play technology is that software is required for both devices. The software usually accompanies a device in packaging in which the device was purchased (e.g., encapsulated within a compact disk). Inclusion of the software together with the product is associated with various inefficiencies. For instance, it can be costly to create software and package it together with a device. For example, in order to place software together with a device within device packaging, costs associated with making, testing, developing, fixing bugs, customizing, branding, burning, etc. are incurred. Additionally, presenting the software on a storage media is associated with other problems. In order to establish compatibility between two devices, a compact disk or other media that includes the software must be present. This can be inconvenient for a traveler who is attempting to interface two devices for a first time, but did not remember to bring the compact disk that retains the requisite software. Inclusion of software is also inefficient because of increased effort required by the user.

To complicate matters, compatibility issues may exist between a device that is desirably interfaced and the compatibility software. For example, the compatibility software can be stored on a CD or DVD drive, whereas a personal computer to which a personal digital assistant is desirably interfaced may not be associated with either drive. Additionally, the personal computer upon which the traveler wishes to install compatibility software may have administrative passwords or some other security functionality that prevents the traveler from using the device. To further complicate matters, it is possible that the traveler lacks the technical knowledge to overcome problems associated with installing compatibility software on a personal computer.

The Internet is also a popular medium from which to obtain software that facilitates plug-and-play functionality between devices. The Internet solves some problems associated with conventional plug and play technology, such as not forcing an individual to retain physical possession of the storage media that houses the device compatibility software. Using the Internet, however, as a storage media for compatibility software is not without its faults. One such fault is that at least one of the desirably synchronized devices (e.g., a personal computer) requires an Internet connection in order to obtain the compatibility software. Furthermore, the user may be required to find the appropriate web site in order to locate the compatibility software. Again, the technically deficient user may encounter difficulties in finding the required software in the vastness of the Internet

SUMMARY

The following presents a simplified summary of the claimed subject matter in order to provide a basic understanding of some aspects of such subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to improving plug and play device capability by including an intelligent agent program to execute compatibility software setup. Through such intelligent agent, many inefficiencies that serve as barriers between a user and desired information can be overcome. In one example, an agent component can be stored in memory of a mobile device, and can facilitate establishing compatibility between a first device and the mobile device. For instance, the first device can be a personal computer, a disparate mobile device, or any other suitable computing device, and the mobile device can be a personal organizer, mobile telephone, camera, media player, etc.

Upon detection of a desire to interface the first device with the mobile device, the software agent component can be pushed from the mobile device to the first device by a transfer component. Once the agent component has been pushed to the first device, the agent component can execute on the first device in order to detect an operating environment of the first device. For example, this detection can include identifying the operating system as well as existence or lack of any software required to establish device connection or a device to device partnership. If the agent component determines that software needed to interface the devices is lacking on the first device, the agent component can access the Internet by way of the first device in order to locate and download the necessary software. If the first device lacks an Internet connection, the agent component can configure the mobile device for use as a modem to procure the files from the Internet. Once the agent component obtains all files required for connectivity, the agent component can configure the first device. Upon completion of the agent component's activity, the mobile device and the first device can exchange or synchronize data that is desired by the user while they are mobile.

Accordingly, in contrast to conventional plug-and-play systems/methodologies, the systems, methods, apparatuses, and articles of manufacture described herein can deliver a true plug-and-play out of box experience. Since the mobile device can contain all necessary software or all necessary instructions required to establish device compatibility, the user is not presented with a confusing additional setup step prior to achieving device to device compatibility. Additionally, as locating the setup files is performed by the agent component, the user need not carry a setup storage media or remember the location of the required files on the Internet.

To the accomplishment of the foregoing and related ends, certain illustrative aspects of the claimed subject matter are described herein in connection with the following description and the annexed drawings. These aspects are indicative, however, of but a few of the various ways in which the principles of the invention may be employed and the subject matter recited in the claims is intended to include all such aspects and their equivalents. Other advantages and novel features may become apparent from the following detailed description when considered in conjunction with the drawings.

DETAILED DESCRIPTION

Figure 1:
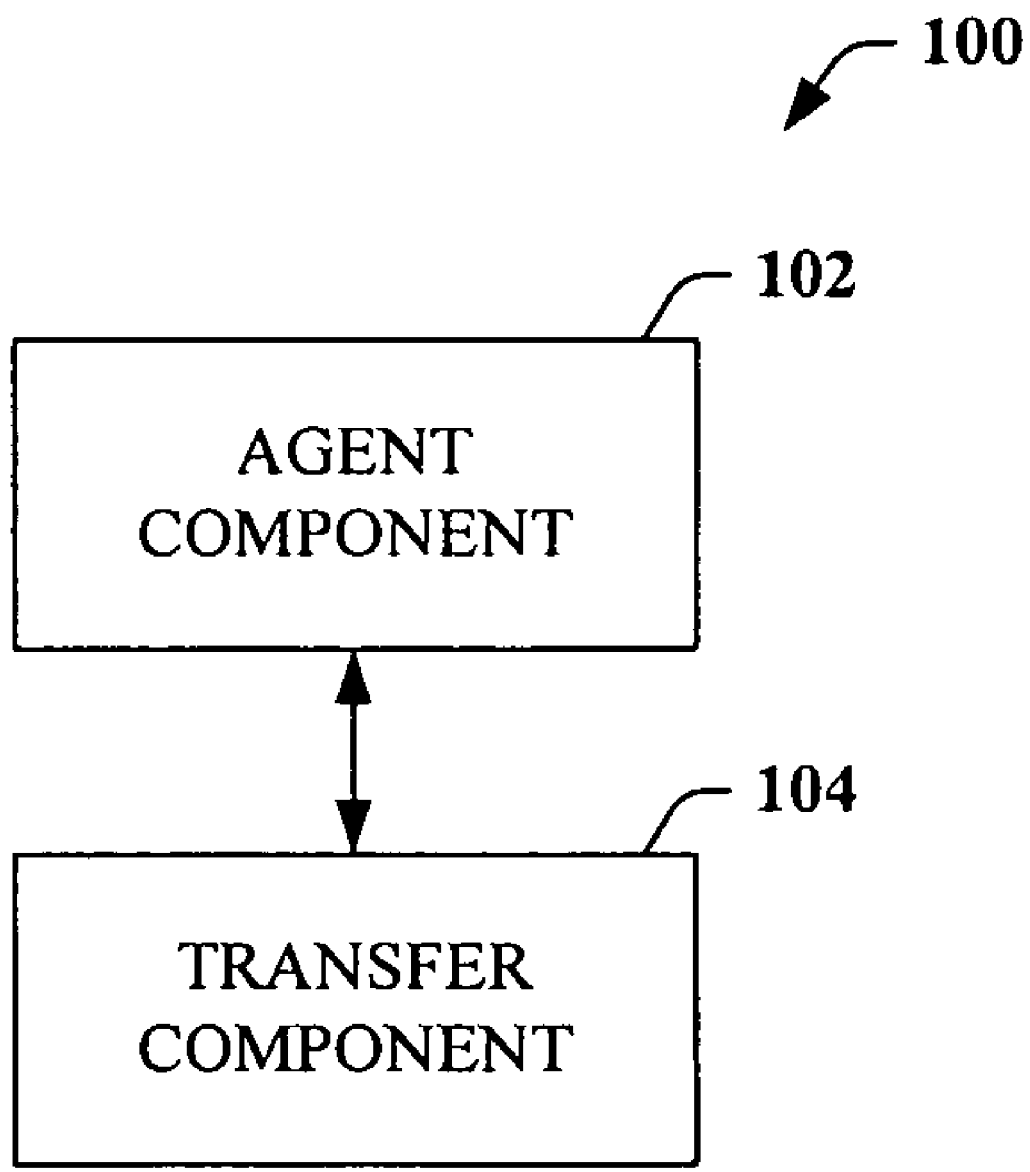
FIG. 1 is a high-level block diagram of a system that delivers files for achieving compatibility between a first device and a mobile device.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject matter as recited in the claims.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Furthermore, the claimed subject matter may be implemented as a method, apparatus, or article of manufacture using standard programming and/or engineering techniques to produce software, firmware, hardware, or any combination thereof to control a computer to implement features disclosed herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

The claimed subject matter will now be described with respect to the drawings, where like numerals represent like elements throughout. Described herein are novel systems, methods, articles of manufacture, and/or apparatuses that facilitate rendering a mobile device compatible with a first device, such as a personal computer. Referring now to FIG. 1, a system 100 that can be employed in connection with delivering files that enable compatibility between a first device and a mobile device is shown. As described above, conventional systems/methods for achieving compatibility between a first device and a mobile device utilize configuration software specific to the first device and configuration software specific to the mobile device. While in some instances two distinct pieces of software can be desirable, a single piece of software that achieves device compatibility can be associated with various benefits over the conventional systems/methods. For instance, since the compatibility software can be stored on the mobile device, the mobile device can be interfaced with a first device and made compatible with the first device without the necessity of implementing additional software upon attempting to interface the mobile device for a first time. The system 100 enables two devices to be compatible while enabling a user to expend a minimal amount of effort.

The system 100 includes an agent component 102 that can execute on a first device in order to establish compatibility between a mobile device and the first device. For example, the agent component 102 can be originally resident upon a mobile device, such as a personal digital assistant, a mobile phone, or any other suitable device. The agent component 102 can include software relating to compatibility, such as device driver, a communication protocol, a security component, Mobile Operator software, an original equipment manufacturer program, an original equipment manufacturer program update, and instructions for attaining compatibility between the first device and a mobile device. The agent component 102 can be executable on a variety of different devices and operating systems, and can be communicated over several protocols.

In more detail, the first device and the mobile device can employ disparate processors. For example, the mobile device can operate on an ARM processor while the first device can operate on an X86 processor. Further, the agent component 102 can be executable on a plurality of devices that employ different operating systems. Thus, it is to be appreciated that the operating systems of the mobile device and first device can also differ. However, despite the differences in hardware architecture and software protocols, the agent component 102 on the mobile device can be specifically designed and compiled for the instruction set supported by the first device. As compatibility can be desired in a multitude of devices, multiple agent components 102 can reside in the mobile device ROM and each agent component 102 can be designed and compiled for an instruction set compatible with devices having disparate hardware and software characteristics. For example, a mobile device may store both an agent component 102 designed and compiled for a personal computer created by a first manufacturer and an agent component 102 designed and compiled for a computer created by a second manufacturer. The system 100 can also include a transfer component 104 that is employed to push the agent component 102 to the first device from the mobile device.

To better illustrate one or more features of the system 100, a specific example is provided herein. It is understood, however, that the example is intended to be explanatory and not limitative in any manner. A user may wish to synchronize information from a desktop personal computer to a mobile device. Conventional methods dictate that a user would need to install software on the mobile device and install software on the computer prior to transferring data therebetween. The system 100, however, in contrast to such conventional systems/methods, enables a true out-of-box plug-and-play experience. Using the example of a personal computer, when a mobile device is first communicatively coupled to the personal computer, the transfer component can push the agent component to the computer. The agent component can execute on the personal computer and establish compatibility between the mobile device and the personal computer.

In another example, to enable plug-and-play between a mobile device and a personal computer, the personal computer may need to be associated with a particular driver. If the computer does not include such driver, then communications between the computer and the mobile device will not be able to occur. Rather, the user must access the Internet by way of the personal computer and locate such driver. Alternatively, the user may have access to a compact disk that includes the driver, wherein the driver can be loaded onto the personal computer by way of such compact disk. Utilizing the system 100, the mobile device can be communicatively coupled to the first device without fear of lack of drivers or other associated software. In one example, the mobile device can be coupled to the personal computer by way of a Universal Serial Bus (USB) port. The agent component 102 can then be pushed by the transfer component 104 from the mobile device to the personal computer by way of the USB connection, and thereafter execute upon the computer. Execution of the agent component 102 can include interrogating the computer for operating system, existent software, lacking software, drivers, firmware, and the like. The agent component 102 can also be associated with software, drivers, and firmware updates, and if the personal computer is lacking any of the aforementioned items the agent component 102 can facilitate provision of such items to the computer. For instance, the agent component 102 can cause the computer to connect to the Internet and download appropriate software. In other words, the agent component 102 can pass sufficient information (e.g., a web address, an FTP address, . . . ) to the personal computer to enable such computer to locate and retrieve software, drivers, etc. to enable compatibility between the personal computer and the mobile device. If the personal computer is not associated with an Internet connection and the mobile device can be utilized to connect to the Internet, the mobile device can be employed as a modem. In still another example, if the personal computer is not connected to the Internet and the mobile device is not associated with Internet capabilities, commands can be stored in memory of the personal computer so that when the computer is connected to the Internet suitable data is retrieved.

Figure 2:
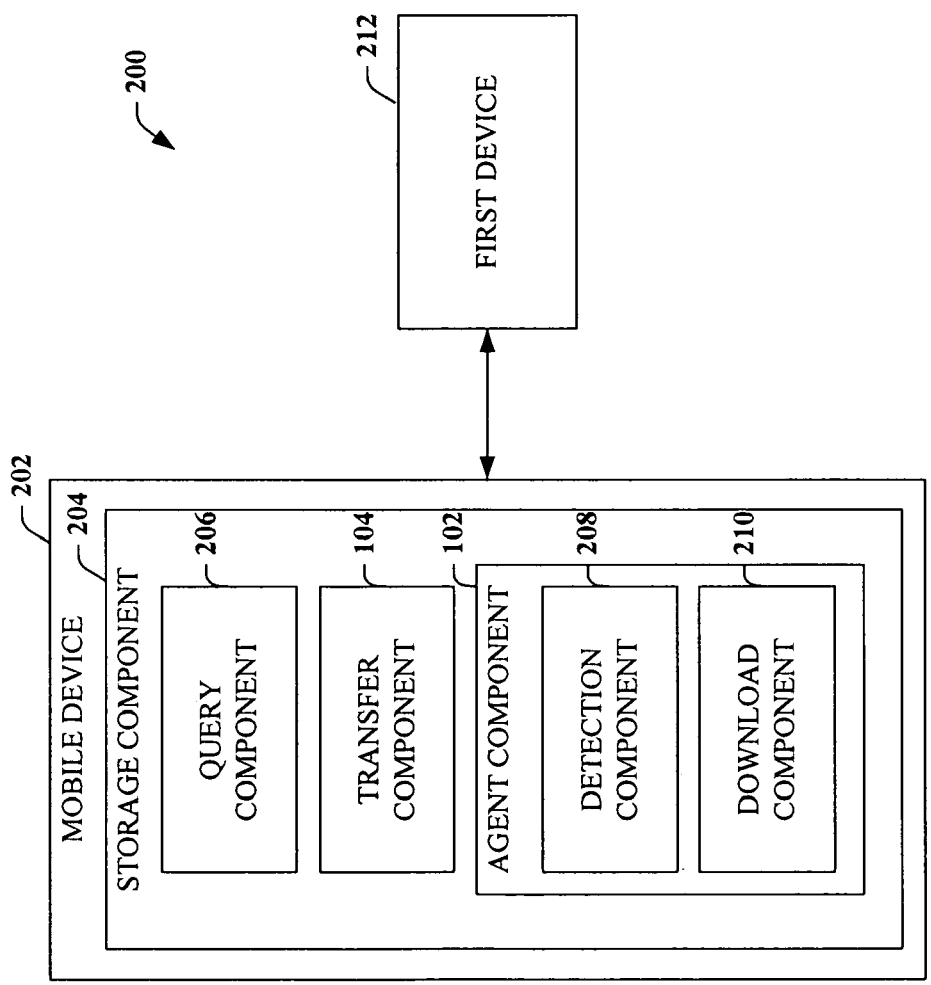
FIG. 2 is a block diagram of a system that configures a first device for compatibility with a mobile device.

Referring now to FIG. 2, system 200 that illustrates deliverance of files enable compatibility between a first device and a mobile device is shown. The system 200 includes a mobile device 202, which can be a telephone, planner, camera, recorder, etc. The mobile device 202 can be associated with a storage component 204, which can retain the agent component 102, a query component 206, and the transfer component 214. The storage component 204 can be a Read-Only memory, a programmable ROM (PROM), electrically programmable ROM (EPROM), electrically erasable ROM (EEPROM), or flash memory. Additionally, the storage component 204 can be a Random-Access memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The query component 206 can provide an interface to the user to facilitate establishing compatibility between a mobile device 202 and a first device 212. In particular, upon interfacing the mobile device 202 to the first device 212, the query component 206 can request user interaction. For example, if the mobile device 202 and the first device 212 are connected via a USB cable, the query component 206 can generate a query similar to the following: "Do you wish to establish a partnership with the first device?" The user can then provide a response that is either affirmative or negative in nature. Additionally, the user can indicate his/her desires that the query component 206 inquire again at a future time. For instance, the query component 206 can cause an interface to be generated that includes a check-box that enables the user to control whether such interface is provided in the future. A display on the mobile device can provide any inquiries and/or interfaces to the user that are generated by the query component 206. In another example, the query component 206 can cause inquiries and/or user interfaces to appear on a display associated with the first device 212. Additionally, the query component 206 can prompt the user on both devices, or by using a third device.

Upon an affirmative indication from a user that the user desires to establish a partnership between the mobile device 202 and the first device 212, the transfer component 104 can push the agent component 102 to the first device 212. The transfer component 104 can utilize a plurality of communicative means to transfer the agent component 102 to the first device 212, such as a wired or wireless connection. Upon the transfer of the agent component 102 from the mobile device 202 to the first device 212, the query component 206 can prompt the user for further input. The query component 206 can prompt the user via a display on a mobile device and/or a first device with a query similar to the following: "Do you want to install compatibility software on the first device?" Upon an affirmative response by the user, the agent component 102 can execute on the first device 212.

In more detail, the agent component 102 can execute on the first device 212 in order to establish compatibility between a mobile device 202 and the first device 212. The agent component 102 can include a detection component 208, which can detect a connection between the mobile device 202 and the first device 212. The connection can be a physical connection and/or a wireless connection. In one particular example, upon the detection component 208 detecting a connection, the query component 206 can prompt the user to confirm a desired action. In another example, upon the detection component 208 detecting a connection, the transfer component 102 can automatically push the agent component 102 to the first device 212.

The agent component 102 can also include a download component 210, which can facilitate downloading software that enables compatibility between the mobile device 202 and the first device 212. For example, the download component 210 can cause the first device 212 to connect to the Internet or utilize a pre-existent Internet connection. If the first device is a personal computer but the computer does not have an Internet connection, the agent component 102 can configure the mobile device 202 as a modem in order to access the Internet to download the associated data. Examples of formats usable to reach the Internet can include but are not limited to UMPS, WIFI, GPRS and CDMA. The download component 210 can also employ a storage media, such as a CD, disk, USB drive, etc, to download compatibility software to the first device 212. For instance, the agent component 102 can be executed on the first device 212 and can detect if the first device 212 requires additional software in order to establish compatibility with the mobile device 202.

It is to be appreciated that the download component 210 can be executed from the mobile device 202. That is, upon the agent component 102 being pushed from the mobile device 202 to the first device 212, the download component 210 can remain on the mobile device 202 and be executed on the mobile device 202. Thus, the agent component 102 executing on the first device 212 can communicate with the download component 210 executing on the mobile device 202. In this manner, the download component 210 executing on the mobile device 202 can execute logic that decides whether the first device 212 has a connection to the internet, and depending on which device has an internet connection, execute a download accordingly.

In another example, the agent component 102 can possess all the required software required to establish compatibility between a mobile device 202 and a first device 212. The download component 210 can periodically or upon user prompting establish a connection to the Internet via the mobile device 202 and download software updates, patches, and the like that facilitate compatibility between the mobile device 202 and the first device 212. Therefore, when the transfer component 104 pushes the agent component 102 to the first device 212, the agent component 102 can possess the most recent compatibility software.

The agent component 102 can also employ the detection component 208 to detect any required additional software. Moreover, the detection component 208 can also detect a version of software associated with the agent component 102. Based upon this detection, updated versions of software can be provided to the mobile device 202 in general and to the agent component 102 in particular. In another example, the detection component 208 can facilitate retrieval of a patch or update to the agent component 102. It is to be noted that the detection component 208 can remain on the mobile device 202 after the agent component 102 has been pushed to the first device 212. In this manner, the detection component 208 can be executed on the mobile device 202 and can determine required compatibility software that the first device 212 lacks. The detection component 208 can then arrange for a download of the required software.

To illustrate one particular use of the system 200, a user may desire to transfer data from a digital camera to a mobile telephone. In this example, the digital camera can be the mobile device 202 and the mobile telephone can be the first device 212. It is also to be understood that the digital camera can be the first device 212 and conversely the mobile telephone can be the mobile device 202. The user can interface the digital camera and the mobile telephone, for example, by communicatively coupling the devices through a USB connection, an infrared (IR) connection, or any other suitable connection. Upon interfacing the two devices, the detection component 208 can detect the connection, and can direct the query component 206 to prompt the user regarding whether the user desires that the devices establish a partnership. The query component can display the user prompt on the mobile telephone and/or the digital camera. Upon an affirmative response by the user, the transfer component 104 can push the agent component 102 to the first device 212, in this example the mobile telephone. The query component 206 can then prompt the user to indicate that the user desires compatibility software be installed on the mobile telephone. Upon an affirmative reply, the agent component 102 can execute on the mobile telephone.

Figure 3:
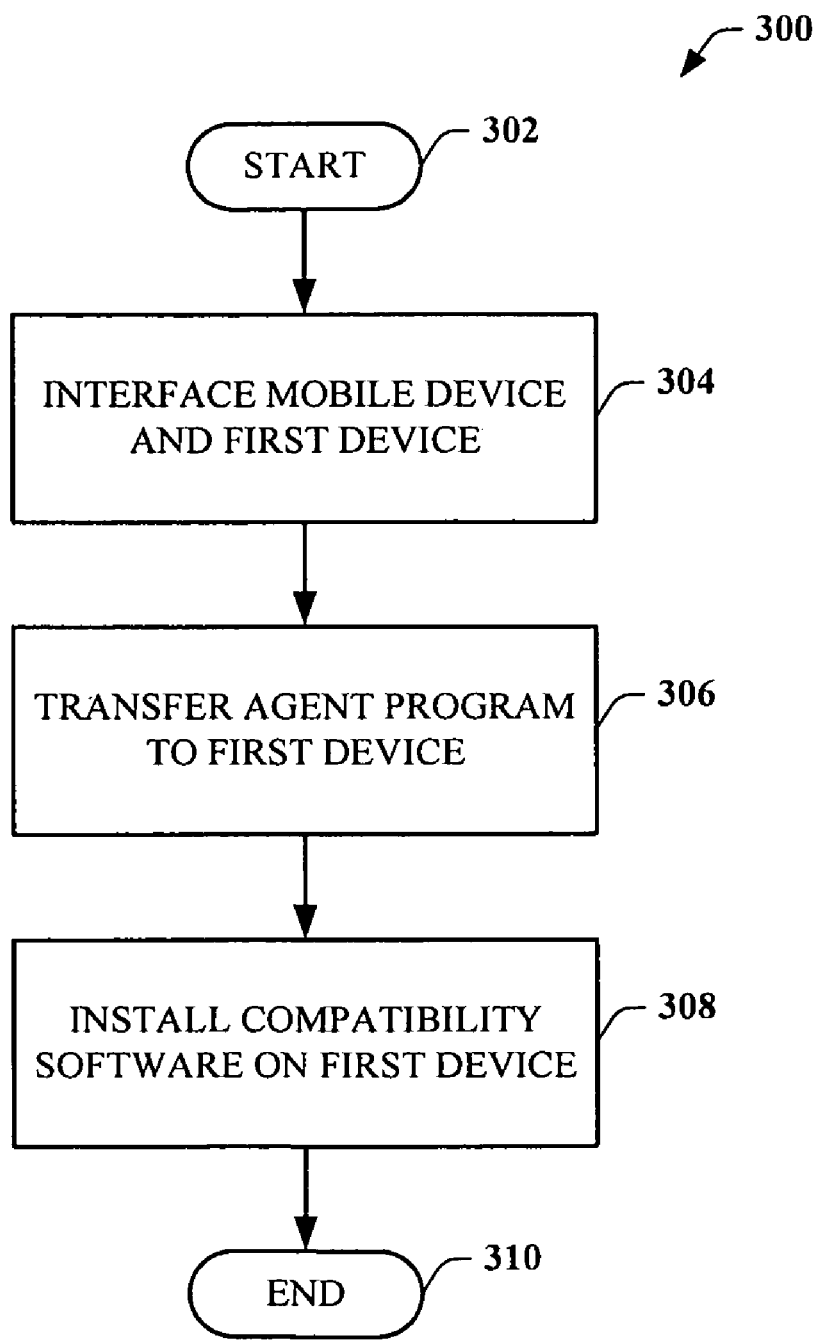
FIG. 3 is a representative flow diagram illustrating a methodology for establishing a communicative relationship between a mobile device and a first device.

Referring now to FIG. 3, a methodology 300 in accordance with the claimed subject matter will now be described by way of a series of acts. It is to be understood and appreciated that the following description is not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 3 illustrates a methodology 300 for establishing a communicative relationship between a first device and a mobile device. The methodology 300 begins at 302, and at 304, a mobile device and first device are interfaced. For instance, the device interface can occur via a wired connection, such as through USB ports, or wireless connection, such as an IR connection. At 306, an agent program is transferred to a first device from a mobile device. For instance, the agent component can be packaged within the mobile device prior to such device being provided to consumers. Upon being transferred to the first device, the agent component can configure the first device for compatibility with the mobile device. At 308, compatibility software can be installed on the first device. For instance, the compatibility software can include drivers, software, software updates, and the like. This software can be packaged with the agent component and/or downloaded automatically from the Internet. The methodology 300 completes at 310.

To provide an example of one utilization of the methodology 300, a handheld personal organizer may desirably be synchronized with a personal computer. To effectuate such synchronization, the two devices can be interfaced. In one example, the interface can occur via a cradle for the organizer that can be plugged into a USB input on the computer. The agent component can be transferred from the personal organizer to the personal computer. In one example, the agent component can contain all necessary software required to configure personal computer compatibility with the organizer. In another example, the agent component can be associated with a detection component that detects software characteristics of the computer. For instance, the detection component can determine which software is necessary to effectuate compatibility between the two devices. The agent program can also utilize a personal computer Internet connection to download the required software. If the personal computer does not have an Internet connection, or if the connection is very slow, the agent program can configure the personal organizer to act as a modem to access the Internet to download required compatibility data. If this is the case, the data (e.g., software or driver) can be transferred from the organizer to the personal computer. Once the agent component receives the required files, or conversely if the agent program was transferred from the mobile device equipped with the necessary compatibility files, the agent program can execute on the personal computer and establish compatibility with the personal organizer. Following completion of execution of the agent program, the personal organizer can be synchronized with the personal computer.

Figure 4:
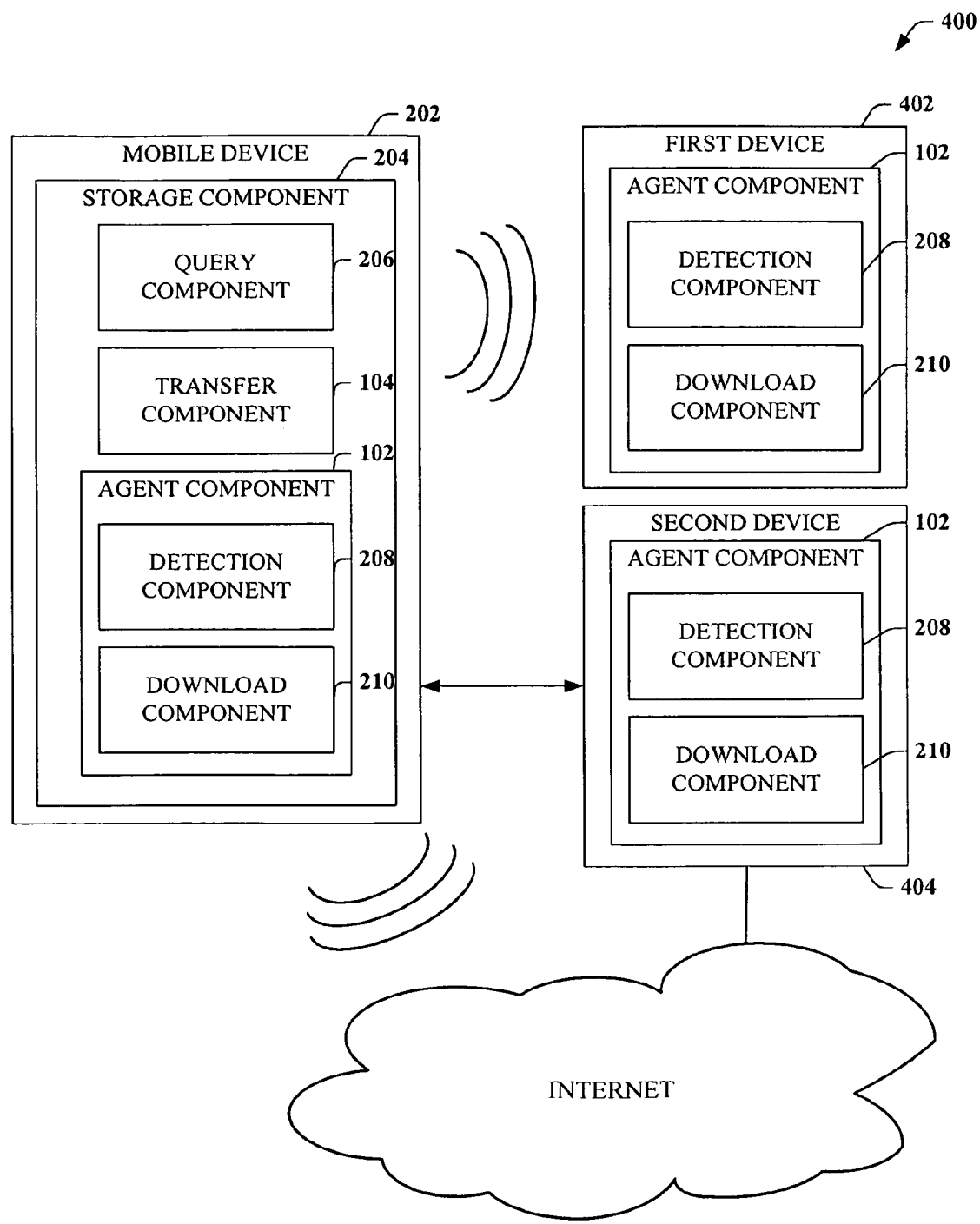
FIG. 4 is a block diagram of a system that configures multiple devices for compatibility with a mobile device.

FIG. 4 illustrates a system 400 where the mobile device 202 (FIG. 2) has transferred the agent component 102 (FIGS. 1 and 2) to a first device 402 and a second device 404. For instance, upon interfacing the mobile device 202 to a first device 402 and a second device 404, the agent component 102 can be pushed to the first device 402, the second device 404, both devices, or neither device, depending on the compatibility desired by a user. The agent component 102 can be transferred wirelessly, for instance, from the mobile device 202 to the first device 402. The agent component 102 can also be transferred via a physical connection, for example, from the mobile device 202 to the second device 404 (e.g., through a USB connection, other serial port, a parallel processing port, . . . ). When the agent component 102 is transferred to the first device 402, the query component 206 can prompt the user to execute the agent component 102, wherein such execution enables compatibility between the mobile device 202 and the first device 402. Likewise, the query component 206 can prompt the user to execute the agent component 102 on the second device 404.

The detection component 208 associated with the agent component 102 on the first device 402 can detect the software or lack thereof existent on the first device 402. The detection component 208 on the first device 402 can then indicate which software is required to enable compatibility between the first device 402 and the mobile device 202. The detection component 208 associated with the first device 402 can also detect that the first device 402 does not have an Internet connection. The agent component 102 associated with the first device 402 can proceed to configure the mobile device 202 to connect to the Internet to retrieve the required files. This connection can be accomplished in a manner consistent with the capabilities and limitations of the mobile device 202. For instance, the connection to the Internet can be established wirelessly.

After establishing the connection to the Internet, the download component 210 associated with the first device 402 can locate and retrieve the required compatibility data determined by the detection component 208 from the Internet. Thereafter, the data can be pushed from the mobile device 202 to the first device 402 for use by the agent component 102 to establish compatibility. The connection to the Internet, retrieval of data (e.g., software), and pushing of such data to the first device 402 can be seamless to the user. Once compatibility has been established between the mobile device 202 and the first device 402, information exchange between the two devices can occur.

The mobile device 202 can also interface with a second device 404, which can be unrelated and communicatively isolated from the first device 402. In another example, the second device 404 can be communicatively coupled to the first device 402 as well as the second device 404. The agent component 102 can be pushed to the second device 404 by the mobile device 202 by way of the transfer component 104, and thereafter the agent component 102 can execute on the second device 404. The detection component 208 associated with the agent component 102 on the second device 404 can determine which software and/or drivers reside on the second device (as well as which software/drivers necessary for compatibility between the mobile device 202 and the second device does not reside upon the second device 404). The detection component 208 on the second device 404 can then indicate which software not resident upon the second device 404 is required to enable compatibility between the second device 404 and the mobile device 202. It is to be noted that the software required to effect compatibility between the second device 404 and the mobile device 202 can be independent of the software required to effect compatibility between the first device 402 and the mobile device 202. It is to be further noted that the agent component 102 may contain all the necessary information required to effect compatibility between the second device 404 and the mobile device 202. Accordingly, it may not be necessary to establish an Internet connection and/or download required software to the second device 404. This can also be the case with the first device 402 (e.g., the agent component 102 has the required software to establish compatibility with the mobile device 202).

The detection component 208 can also detect whether the second device 404 is and/or can be connected to the Internet. If it is determined that the second device is connected to the Internet, the download component 210 associated with the second device 404 can download the required software from the Internet to the second device 404. In another example, the detection component 208 can cause the second device 404 to connect to the Internet (e.g., by providing directions to connect via a modem). The agent component 102 associated with the second device 404 can use the downloaded filed to effect compatibility between the second device 404 and the mobile device 202.

Figure 5:
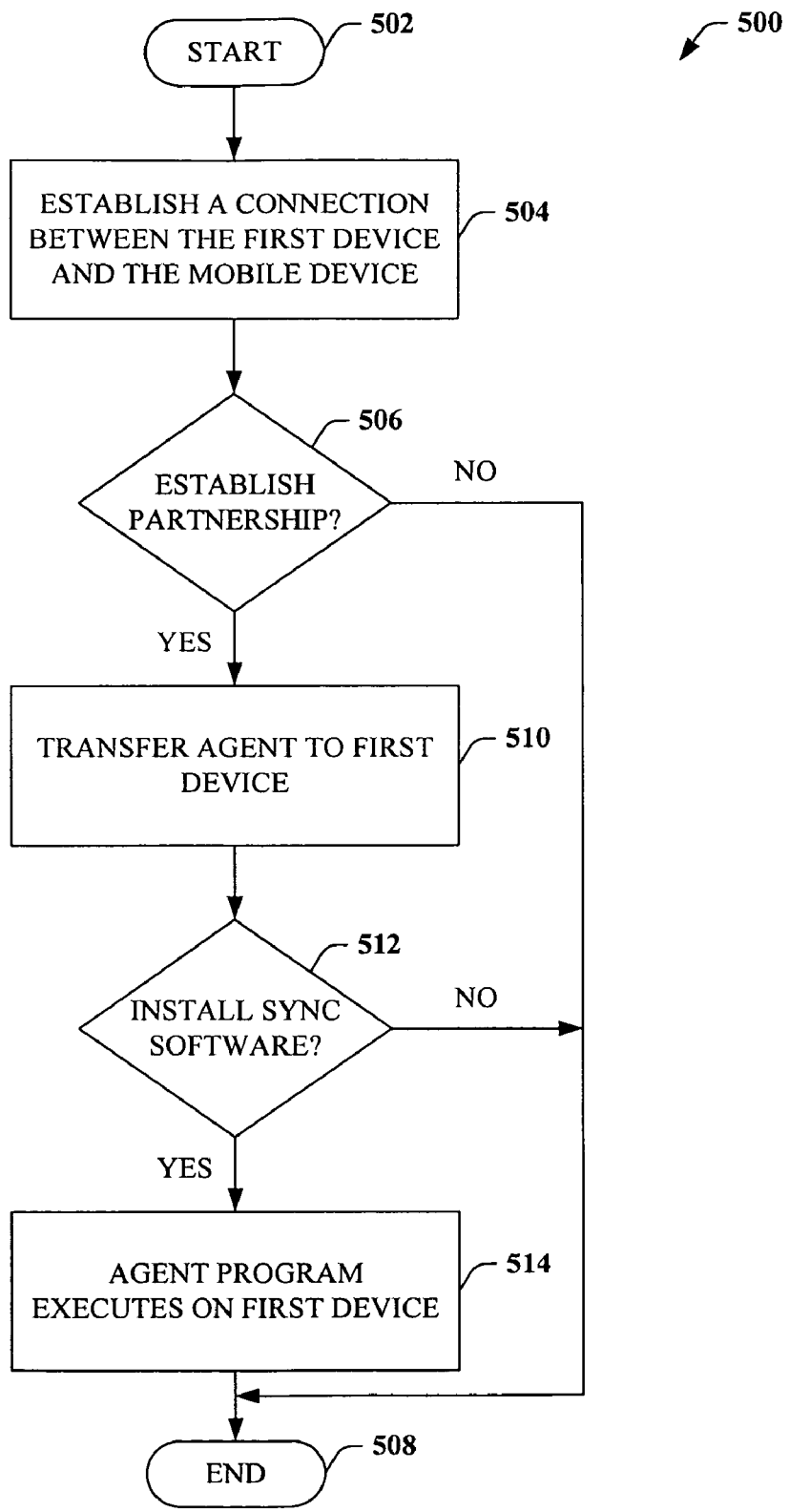
FIG. 5 is a representative flow diagram illustrating a methodology for executing an agent program on a first device.

Turning now to FIG. 5, a methodology 500 for executing an agent on a first device is illustrated. The methodology 500 begins at 502, and at 504 a connection between a first device and a mobile device is established. The connection can be a wired connection, for instance, through a USB, and/or or a wireless connection. At 506, the user can be prompted to establish a partnership by way of a user interface provided on a graphical display of the first device and/or the mobile device. If the user declines to establish a partnership, the methodology 500 completes at 508. If the user wishes to establish a partnership between the first device and the mobile device, the agent can be transferred to the first device at 510. For instance, the agent can initially be stored on the mobile device in memory, on a hard disk resident upon the mobile device, on a smart card on the mobile device, and the like. Once the agent is transferred to the first device, the user can be prompted to install synchronization software at 512. If the user declines, the user can be directed to the end of methodology 500 at 508. Additionally, the user may be prompted again at a later time to install the synchronization software. If the user chooses to install the synchronization software, the agent component can execute on the first device at 514. For instance, the agent component can determine software, drivers, and the like that are necessary to enable synchronization of the first device and the second device. The agent program can then act as described herein to enable data transfer between the mobile device and the first device.

Figure 6:
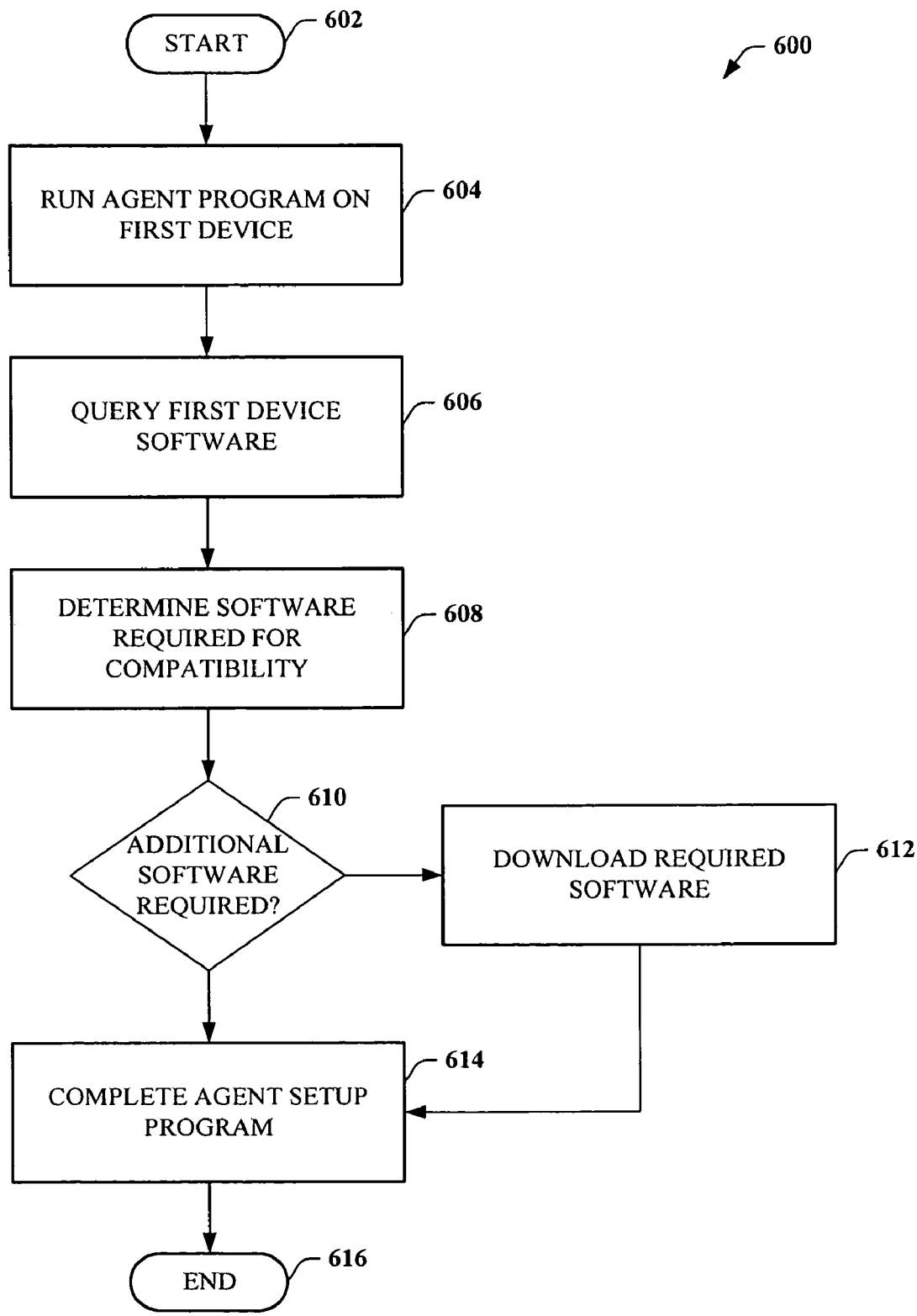
FIG. 6 is a representative flow diagram illustrating a methodology for determining software required for first device compatibility with a mobile device.

FIG. 6 illustrates a methodology 600 for collecting a list of files needed for device compatibility. The methodology 600 begins at 602, and at 604 an agent program is executed on a first device. At 606, the agent program queries the first device for software resident thereon and an operating system associated with the first device. In this manner, the agent is intelligent in that it can determine the operating environment of the first device. At 608, the software required for compatibility is determined. This determination can be based in part on the software resident upon the first device and the software associated with the agent program. At 610, a determination is made regarding whether additional software is required. If additional software is required, the methodology 600 proceeds to 612 to download the appropriate software from the Internet or an intranet. For instance, the software can be downloaded using an Internet connection associated with the first device. If the first device does not have an Internet connection, is isolated from the Internet, or the Internet connection is not configured, the agent program can configure a mobile device to access the Internet and download the appropriate software. This software can then be transferred from the mobile device to the first device. At 614 the agent program can complete the setup program and device compatibility can be achieved (e.g., data can be transmitted between the devices). The methodology 600 then completes at 616.

Figure 7:
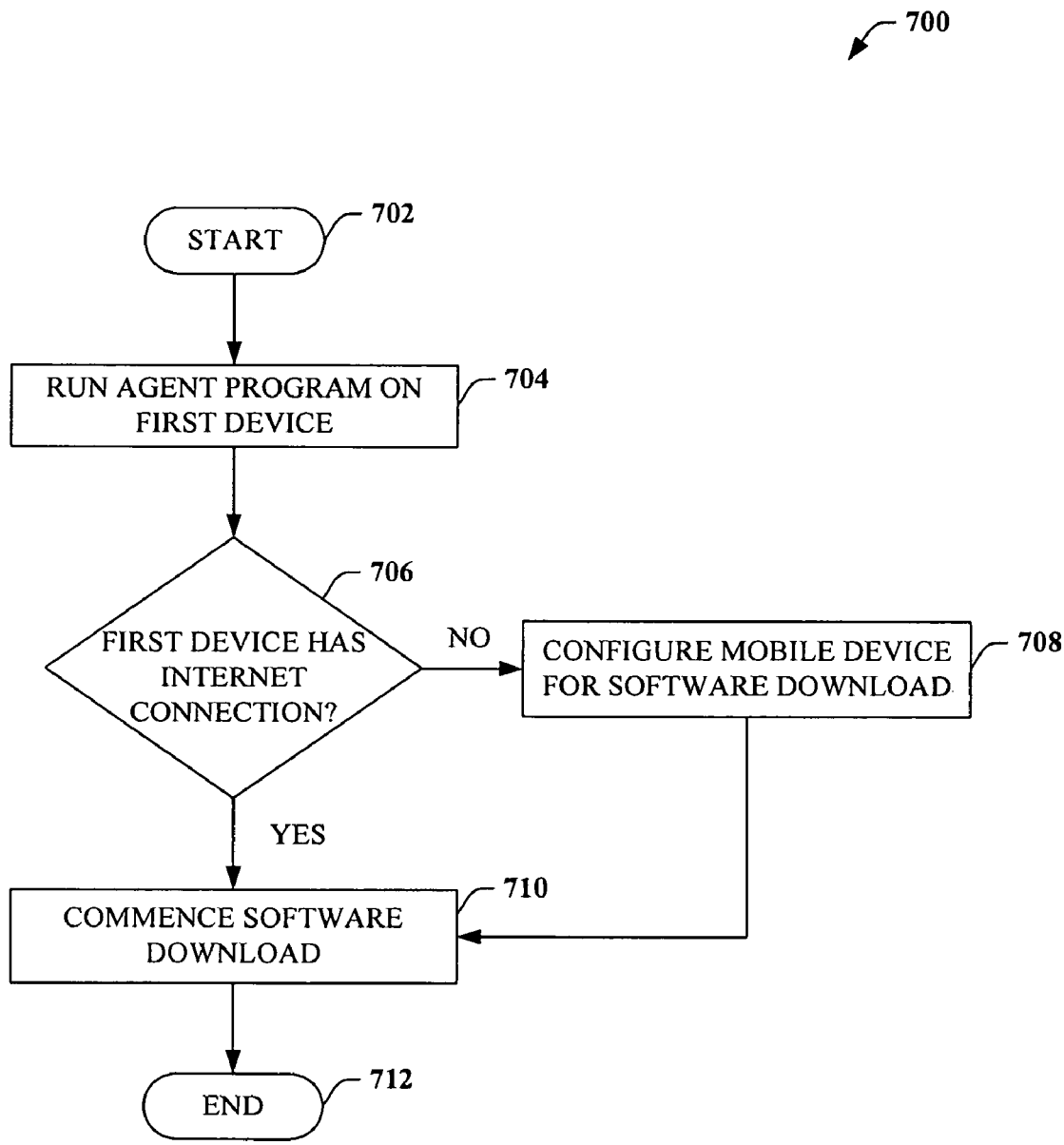
FIG. 7 is a representative flow diagram illustrating a methodology for accessing the Internet via a first device and/or a mobile device.

Turning now to FIG. 7, a method 700 for accessing the Internet via a mobile device and/or a first device is illustrated. The method 700 begins at 702, and at 704 an agent program is executed on a first device, wherein the first device can be any device with which a user desires to make compatible with a mobile device. For instance, the first device can be stationary, such as a desktop computer, and/or can be a mobile device, such as a mobile phone, a PDA, etc. At 706, a determination is made regarding whether the first device is associated with an Internet connection. If the device does not have an Internet connection, then at 708 the agent program can configure the mobile device for a software download. In this manner, the device can be used as a modem for the first device to procure files needed for compatibility between a mobile device and a first device. Thereafter, at 710, a software download can be commenced. Similarly, if it is determined at 704 that the first device has an Internet connection, then the software download can be commenced at 710. The download can include files necessary to effectuate compatibility between the first device and the mobile device, thereby enabling information exchange to take place between the mobile device and the first device.

Figure 8:
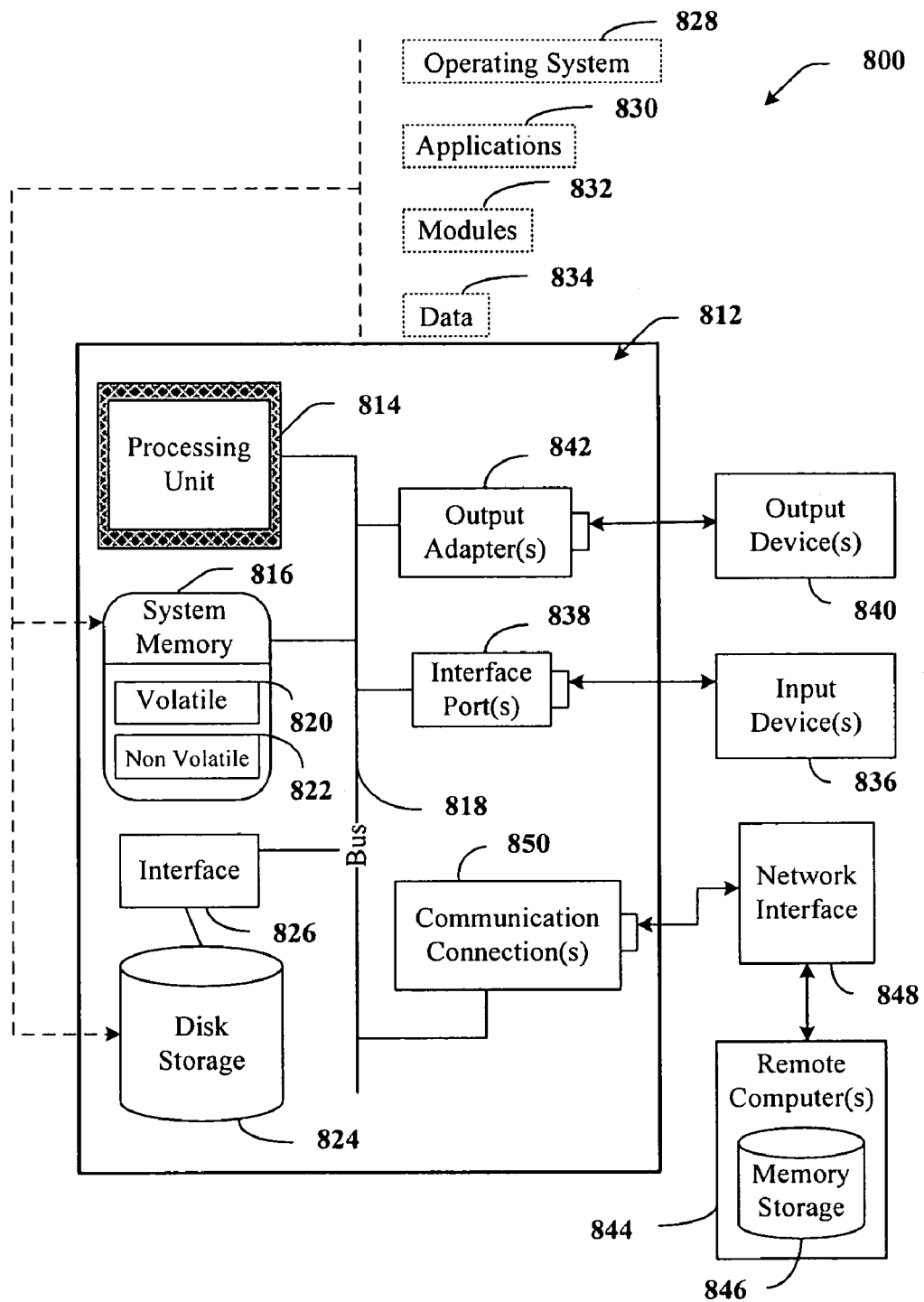
FIG. 8 is a schematic block diagram illustrating a suitable operating environment.

In order to provide additional context for various aspects of the claimed subject matter, FIG. 8 and the following discussion are intended to provide a brief, general description of a suitable operating environment 810 in which various aspects described herein may be implemented. While the claimed subject matter is described in the general context of computer-executable instructions, such as program modules, executed by one or more computers or other devices, those skilled in the art will recognize that aspects described herein can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the claimed subject matter. Other well known computer systems, environments, and/or configurations that may be suitable for use with aspects described herein include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various claimed aspects includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812.

System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
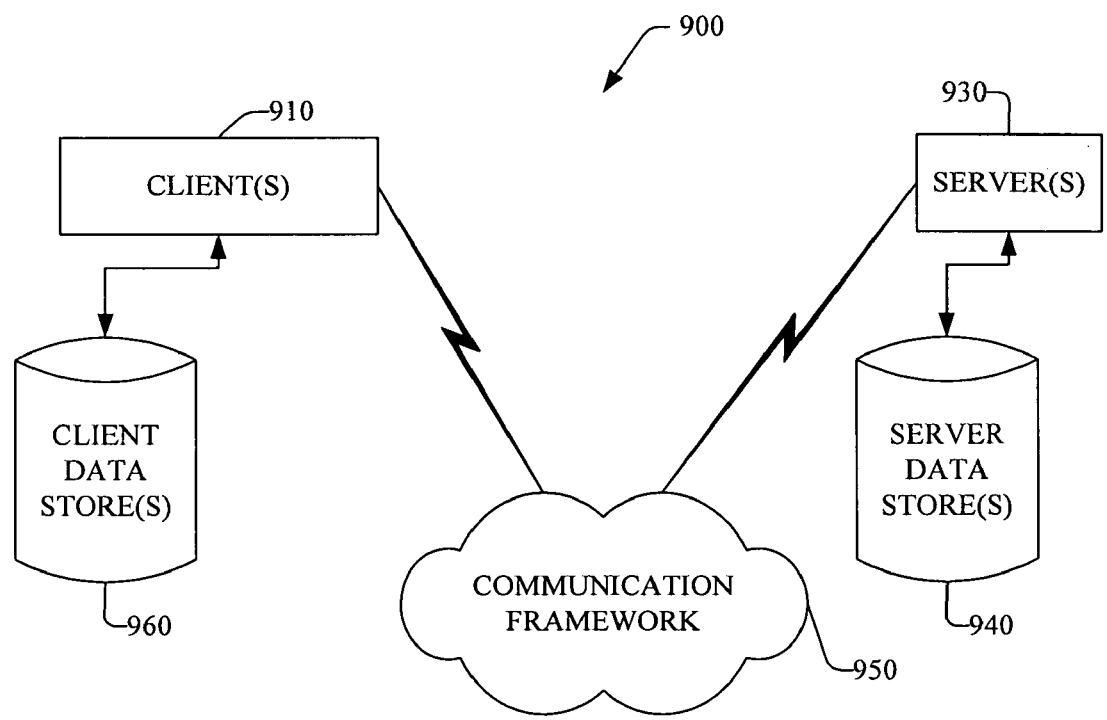
FIG. 9 is a schematic block diagram of a sample-computing environment.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations. One possible communication between a client 910 and a server 930 can be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the claimed subject matter. It is, of course, not possible to describe every conceivable combination of components or methodologies for purposes of describing such claimed matter, but one of ordinary skill in the art may recognize that many further combinations and permutations are possible. Accordingly, features described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A plug-and-play system comprising the following computer-executable components:
    a mobile device including a plurality of agent components, each agent component includes instructions for enabling a first device and the mobile device to be compatible upon establishing a connection between the first device and the mobile device, wherein each agent component is compatible with at least one of a plurality of operating systems, at least two agent components are compatible with a different operating system from each other; and
    a transfer component that pushes one of the plurality of agent components from the mobile device to the first device based upon the hardware and software characteristics of the first device, the agent component executes upon reaching the first device.

2. The system of claim 1, each agent component comprises at least one of a device driver, a communication protocol, a security component, a Mobile Operator software, an original equipment manufacturer program, and an original equipment manufacturer program update.

3. The system of claim 1, each agent component comprises a detection component that detects at least one of an operating system associated with the first device, identity of the mobile device, software resident upon the first device, and software necessary to enable compatibility between the first device and the mobile device.

4. The system of claim 3, the detection component detects a connection between the first device and the mobile device, the connection is at least one of a physical connection and a wireless connection.

5. The system of claim 1, each agent component comprises a download component that employs at least one of a first device Internet connection and a mobile device Internet connection to download applicable compatibility software.

6. The system of claim 5, the download component employs one of an Internet connection and a storage media to obtain necessary supplemental media.

7. The system of claim 6, the necessary supplemental media is software related to at least one of original equipment manufacturer software, media samples, ads, and browser favorites.

8. The system of claim 1, the transferred agent component executes on the first device to configure compatibility between the first device and the mobile device.

9. The system of claim 1, further comprising a query component that requests input relating to the agent components.

10. The system of claim 9, the query component provides a query to a user regarding whether a connection between the mobile device and the first device is desired.

11. The system of claim 9, the query component provides a query to a user regarding whether to push an agent component to the first device.

12. The system of claim 11, the query component instructs the transfer component to push the one of the plurality of agent components to the first device upon an input to the query indicating that an agent component should be pushed to the first device.

13. The system of claim 1, wherein the mobile device is at least one of a camera, a personal organizer, a personal digital assistant, a mobile phone, or media player.

14. The system of claim 13, wherein the first device is a personal computer or another mobile device.

15. A method for enabling plug-and play functionality between a mobile device and a first device comprising the following computer-executable acts:
 coupling the mobile device and the first device, the mobile device including a plurality of agent programs, each agent program includes instructions for enabling the first device and the mobile device to be compatible upon establishing a connection between the first device and the mobile device, wherein each agent component is compatible with at least one of a plurality of operating systems, at least two agent components are compatible with a different operating system from each other;
 transferring one of the agent programs from the mobile device to the first device upon detection of the mobile device and the first device being coupled based upon the hardware and software characteristics of the first device; and
 utilizing the agent program to enable the mobile device to be compatible with the first device.

16. The method of claim 15, coupling the mobile device and the first device comprises at least one of wirelessly coupling the mobile device and the first device and coupling the mobile device and the first device by way of wireline.

17. The method of claim 15, further comprising updating the agent programs upon the mobile device.

18. The method of claim 17, updating the agent programs comprising obtaining software related to at least one of original equipment manufacturer software, media samples, ads, and browser favorites.

19. The method of claim 15, further comprising prompting a user to at least one of initiate communication between the mobile device and the first device, and initiate transfer of the one of the agent programs from the mobile device to the first device.

20. A system that facilitates plug-and-play functionality between a mobile device and a first device, the system comprising:
 a plurality of means for configuring synchronization between the first device and the mobile device, the plurality of means for configuring synchronization is stored on the mobile device, wherein each of the plurality of means for configuring synchronization is compatible with at least one of a plurality of operating systems, at least two of the plurality of means for configuring synchronization are compatible with a different operating system from each other;
 means for transferring one of the plurality of means for configuring synchronization from the mobile device to the first device, based upon the hardware and software characteristics of the first device.

* * * * *